(12) United States Patent
An et al.

(10) Patent No.: US 9,462,265 B2
(45) Date of Patent: Oct. 4, 2016

(54) METHOD OF MEASURING LIGHT EMISSION OF DISPLAY PANEL AND METHOD OF COMPENSATING LIGHT EMISSION OF DISPLAY PANEL

(71) Applicant: Samsung Display Co., Ltd., Yongin, Gyeonggi-Do (KR)

(72) Inventors: Byoung-Kwan An, Suwon-si (KR); Sung-Mo Yang, Hwaseong-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 0 days.

(21) Appl. No.: 14/730,949

(22) Filed: Jun. 4, 2015

(65) Prior Publication Data

US 2016/0198153 A1 Jul. 7, 2016

(30) Foreign Application Priority Data

Jan. 6, 2015 (KR) ........................ 10-2015-0001090

(51) Int. Cl.
| | |
|---|---|
| *H04N 17/04* | (2006.01) |
| *H04N 17/02* | (2006.01) |
| *G09G 3/32* | (2016.01) |
| *H04N 5/225* | (2006.01) |

(52) U.S. Cl.
CPC ............ *H04N 17/04* (2013.01); *G09G 3/3208* (2013.01); *H04N 5/225* (2013.01); *H04N 17/02* (2013.01)

(58) Field of Classification Search
CPC ..................................................... H04N 13/04
USPC ........................................ 348/189, 187, 188
See application file for complete search history.

(56) References Cited

U.S. PATENT DOCUMENTS

| | | | | |
|---|---|---|---|---|
| 5,638,167 | A * | 6/1997 | Nakamura ............ | G02F 1/1309 348/189 |
| 8,836,796 | B2 * | 9/2014 | Dickins .................. | G09G 3/006 348/189 |
| 2003/0098930 | A1* | 5/2003 | Seo .......................... | H04N 9/28 348/806 |
| 2003/0193564 | A1* | 10/2003 | Jenkins .................. | H04N 17/04 348/182 |

(Continued)

FOREIGN PATENT DOCUMENTS

| | | |
|---|---|---|
| KR | 10-1999-0068771 A | 9/1999 |
| KR | 10-2000-0031904 A | 6/2000 |
| KR | 10-2005-0041357 A | 5/2005 |

(Continued)

*Primary Examiner* — Paulos M Natnael
(74) *Attorney, Agent, or Firm* — Knobbe Martens Olson & Bear LLP

(57) ABSTRACT

A method of measuring light emission of a display panel and a method of compensating light emission of a display panel are disclosed. In one aspect the method of measuring light emission includes setting a location of a camera such that a imaging range area of the camera includes a first divided region among a plurality of divided regions, wherein the display panel is larger than the imaging range area of the camera and includes the divided regions, and wherein each of the divided regions is smaller than the imaging range area; first displaying a recognition pattern image on the first divided region. The method also includes shooting the first divided region by the camera so as to generate a recognition pattern shot; second displaying a single-color image on the first divided region.

20 Claims, 17 Drawing Sheets

(56) References Cited

U.S. PATENT DOCUMENTS

| | | | |
|---|---|---|---|
| 2008/0088856 A1* | 4/2008 | Nishio | G01B 11/24 356/623 |
| 2010/0066817 A1* | 3/2010 | Zomet | H04N 13/0425 348/51 |
| 2013/0088589 A1* | 4/2013 | Negoro | G01J 1/04 348/135 |
| 2013/0321769 A1* | 12/2013 | Kusumoto | A61B 3/1025 351/206 |
| 2014/0152794 A1* | 6/2014 | Takahashi | G01B 11/24 348/79 |
| 2014/0292997 A1* | 10/2014 | Hung | H04N 9/735 348/14.01 |

FOREIGN PATENT DOCUMENTS

| | | |
|---|---|---|
| KR | 10-2006-0111088 A | 10/2006 |
| KR | 10-2007-0016353 A | 2/2007 |
| KR | 10-2009-0097081 A | 9/2009 |
| KR | 10-2014-0070795 A | 6/2014 |
| KR | 10-2014-0095333 A | 8/2014 |

* cited by examiner

S143

S191

```
Int RD = MAX;

Unit mask m;
Index pattern B = 1 pixel dot;

while (A > B)
{
    B = B DIL m;
    RD--;
}
```

210-3

210-4

METHOD OF MEASURING LIGHT EMISSION OF DISPLAY PANEL AND METHOD OF COMPENSATING LIGHT EMISSION OF DISPLAY PANEL

CROSS-REFERENCE TO RELATED APPLICATION(S)

This application claims priority under 35 USC §119 to Korean Patent Applications No. 10-2015-0001090, filed on Jan. 6, 2015 in the Korean Intellectual Property Office (KIPO), the contents of which are incorporated herein in its entirety by reference.

BACKGROUND

1. Field

The described technology generally relates to a method of measuring light emission of a display panel and a method of compensating light emission of a display panel.

2. Description of the Related Technology

Organic light-emitting diode (OLED) displays do not need a light source (e.g., backlight unit), unlike liquid crystal displays (LCDs). Thus, an OLED display can be relatively thin and light. In addition, OLED technology has favorable characteristics such as low power consumption, improved luminance, improved response speed, etc., compared to LCD technology. Hence, OLED displays are widely used in electronic devices today.

SUMMARY OF CERTAIN INVENTIVE ASPECTS

One inventive aspect relates to a method of measuring light emitting status of a display panel by using a camera with a shooting range that is smaller than the display panel.

Another aspect is a method of compensating light emitting status of a display panel by using a camera with a shooting range that is smaller than the display panel.

Another aspect is a method of measuring light emitting status of a display panel, which is larger than a shooting range of a camera, and has a plurality of divided regions, each of which is smaller than the shooting range, that includes a setting a location of the camera such that the shooting range includes a first divided region among the plurality of the divided regions; a displaying a recognition pattern image on the first divided region and generating, by the camera, a recognition pattern shot by shooting the first divided region; a displaying a single-color image on the first divided region and generating, by the camera, a single-color shot by shooting the first divided region; a generating a modified single-color shot corresponding to the first divided region by modifying the single-color shot based on the recognition pattern shot; a repeating setting the location of the camera, displaying the recognition pattern image, displaying the single-color image, and generating the modified single-color shot until all of modified single-color shots corresponding to the plurality of the divided regions are generated; and a generating a whole single-color shot of the display panel by combining the all of the modified single-color shots.

In an example embodiment, generating the modified single-color shot includes a generating a rotated recognition pattern shot and a rotated single-color shot by compensating angle error of the recognition pattern shot and the single-color shot; an extracting an effective single-color shot among the rotated single-color shot, the effective single-color shot corresponding to an effective recognition pattern shot included in the rotated recognition pattern shot; and a generating the modified single-color shot by expanding or reducing the effective single-color shot based on the effective recognition pattern shot.

In an example embodiment, generating the rotated recognition pattern shot and the rotated single-color shot includes a calculating a rotation angle by comparing a first angle and a reference angle, the first angle formed between a straight line, which passes centers of first and second shooting patterns included the recognition pattern shot, and an edge of the recognition pattern shot; a generating the rotated recognition pattern shot by rotating the recognition pattern shot as much as the rotation angle; and a generating the rotated single-color shot by rotating the single-color shot as much as the rotation angle.

In an example embodiment, the reference angle is formed between a straight line, which passes centers of first and second patterns included in the recognition pattern image, and an edge of the recognition pattern image.

In an example embodiment, extracting the effective single-color shot among the rotated single-color shot includes a finding the effective recognition pattern shot corresponding to the first divided region among the rotated recognition pattern shot based on location of first and second rotated shooting patterns included in the rotated recognition pattern shot; and an extracting the effective single-color shot corresponding to the effective recognition pattern shot among the rotated single-color shot.

In an example embodiment, generating the modified single-color shot includes a calculating a relative distance corresponding to a distance between the first divided region and the camera based on size of first and second effective shooting patterns included in the effective recognition pattern shot; a generating the modified single-color shot by expanding the effective single-color shot when the relative distance is greater than a reference distance; an outputting the effective single-color shot as the modified single-color shot when the relative distance is the same as the reference distance; and a generating the modified single-color shot by reducing the effective single-color shot when the relative distance is smaller than the reference distance.

In an example embodiment, calculating the relative distance includes a calculating the relative distance by comparing size of the first and second effective shooting patterns and size of a reference pattern, which is expanded repeatedly through a dilation operation based on a unit mask.

In an example embodiment, the reference distance is a relative distance corresponding to a distance between the first divided region and the camera when size of first and second patterns included in the recognition pattern image is the same as size of the first and second effective shooting patterns.

In an example embodiment, each of the plurality of the divided regions has a rectangle shape.

In an example embodiment, the recognition pattern image includes a first pattern and a second pattern. The first pattern can be disposed at center of the recognition pattern image. The second pattern can have a center disposed in a straight line, which passes a center of the first pattern and a vertex of the recognition pattern image. The recognition pattern shot can include a first shooting pattern corresponding to the first pattern, and a second shooting pattern corresponding to the second pattern.

In an example embodiment, size of the first pattern is different from size of the second pattern.

In an example embodiment, each of the first and second patterns has a circle shape, a triangle shape, a rectangle shape, or a rhombus shape.

Another aspect is a method of compensating light emitting status of a display panel, which is larger than a shooting range of a camera, and has a plurality of divided regions, each of which is smaller than the shooting range, includes a setting a location of the camera such that the shooting range includes a first divided region among the plurality of the divided regions; a displaying a recognition pattern image on the first divided region and generating, by the camera, a recognition pattern shot by shooting the first divided region; a displaying a single-color image on the first divided region and generating, by the camera, a single-color shot by shooting the first divided region; a generating a modified single-color shot corresponding to the first divided region by modifying the single-color shot based on the recognition pattern shot; a repeating setting the location of the camera, displaying the recognition pattern image, displaying the single-color image, and generating the modified single-color shot until all of modified single-color shot corresponding to the plurality of the divided regions are generated; a generating a whole single-color shot of the display panel by combining the all of the modified single-color shots; and a compensating light emitting status of the display panel based on the whole single-color shot.

In an example embodiment, generating the modified single-color shot includes a generating a rotated recognition pattern shot and a rotated single-color shot by compensating angle error of the recognition pattern shot and the single-color shot; an extracting an effective single-color shot among the rotated single-color shot, the effective single-color shot corresponding to an effective recognition pattern shot included in the rotated recognition pattern shot; and a generating the modified single-color shot by expanding or reducing the effective single-color shot based on the effective recognition pattern shot.

In an example embodiment, compensating the light status of the display panel includes a decreasing current to target pixels of the display panel, the target pixels corresponding to a region having relatively high luminance in the whole single-color shot.

In an example embodiment, compensating the light status of the display panel includes an increasing current to target pixels of the display panel, the target pixels corresponding to a region having has relatively low luminance in the whole single-color shot.

Another aspect is a method of measuring light emission characteristics of a display panel, comprising: setting a location of a camera such that a imaging range area of the camera includes a first divided region among a plurality of divided regions, wherein the display panel is larger than the imaging range area of the camera and includes the divided regions, and wherein each of the divided regions is smaller than the imaging range area; first displaying a recognition pattern image on the first divided region; first shooting the first divided region by the camera so as to generate a recognition pattern shot; second displaying a single-color image on the first divided region; second shooting the first divided region by the camera so as to generate a single-color shot; modifying the single-color shot based on the recognition pattern shot so as to generate a modified single-color shot corresponding to the first divided region; repeatedly performing the setting, the first displaying, the first shooting, the second displaying, the second shooting, and the modifying until all of the modified single-color shots corresponding to the divided regions are generated; and combining all of the modified single-color shots so as to generate a whole single-color shot of the display panel.

In the above method, the modifying includes: compensating an angle error of the recognition pattern shot and the single-color shot so as to generate a rotated recognition pattern shot and a rotated single-color shot; extracting an effective single-color shot from the rotated single-color shot, wherein the effective single-color shot corresponds to an effective recognition pattern shot included in the rotated recognition pattern shot; and expanding or reducing the effective single-color shot based on the effective recognition pattern shot so as to generate the modified single-color shot.

In the above method, the compensating includes: comparing a first angle and a reference angle so as to calculate a rotation angle, wherein the first angle is calculated between a line, which passes centers of first and second shooting patterns included in the recognition pattern shot, and an edge of the recognition pattern shot; rotating the recognition pattern shot as much as the rotation angle so as to generate the rotated recognition pattern shot; and rotating the single-color shot as much as the rotation angle so as to generate the rotated single-color shot.

In the above method, the reference angle is formed between a line, which passes centers of first and second patterns included in the recognition pattern image, and an edge of the recognition pattern image.

In the above method, the extracting includes obtaining the effective recognition pattern shot corresponding to the first divided region from the rotated recognition pattern shot based on the location of first and second rotated shooting patterns included in the rotated recognition pattern shot.

In the above method, the modifying further includes: calculating a relative distance corresponding to the distance between the first divided region and the camera based on the sizes of first and second effective shooting patterns included in the effective recognition pattern shot; expanding the effective single-color shot when the relative distance is greater than a reference distance so as to generate the modified single-color shot; outputting the effective single-color shot as the modified single-color shot when the relative distance is substantially the same as the reference distance; and reducing the effective single-color shot so as to generate the modified single-color shot when the relative distance is less than the reference distance.

In the above method, the calculating includes comparing the sizes of the first and second effective shooting patterns and the size of a reference pattern so as to calculate the relative distance, wherein the reference pattern is expanded repeatedly through a dilation operation via a unit mask.

In the above method, the reference distance is a relative distance corresponding to the distance between the first divided region and the camera when the sizes of first and second patterns included in the recognition pattern image are substantially the same as the sizes of the first and second effective shooting patterns.

In the above method, each of the divided regions has a rectangular shape.

In the above method, the recognition pattern image includes: a first pattern displayed at a center of the recognition pattern image; and a second pattern having a center located in a line that passes a center of the first pattern and a vertex of the recognition pattern image. In the above method, the recognition pattern shot includes: a first shooting pattern corresponding to the first pattern; and a second shooting pattern corresponding to the second pattern.

In the above method, the size of the first pattern is different from the size of the second pattern.

In the above method, each of the first and second patterns has a substantially circular, triangular, rectangular or rhombus shape.

Another aspect is a method of compensating light emission of a display panel, comprising: setting a location of a camera such that a imaging range area of the camera includes a first divided region among a plurality of divided regions, wherein the display panel is larger than the imaging range area and includes a plurality of divided regions, and wherein each of the divided regions is smaller than the imaging range area; first displaying a recognition pattern image on the first divided region; first shooting the first divided region so as to generate, by the camera, a recognition pattern shot; second displaying a single-color image on the first divided region; second shooting the first divided region so as to generate, by the camera, a single-color shot; modifying the single-color shot based on the recognition pattern shot so as to generate a modified single-color shot corresponding to the first divided region; repeatedly performing the setting, the first displaying, the first shooting, the second displaying, the second shooting and the modifying until all of the modified single-color shot corresponding to the divided regions are generated; combining all of the modified single-color shots so as to generate a whole single-color shot of the display panel; and compensating the light emission characteristics of the display panel based on the whole single-color shot.

The method of claim 13, wherein the modifying includes: compensating an angle error of the recognition pattern shot and the single-color shot so as to generate a rotated recognition pattern shot and a rotated single-color shot; extracting an effective single-color shot from the rotated single-color shot, wherein the effective single-color shot corresponds to an effective recognition pattern shot included in the rotated recognition pattern shot; and expanding or reducing the effective single-color shot based on the effective recognition pattern shot so as to generate the modified single-color shot.

In the above method, compensating the angle error includes: comparing a first angle and a reference angle so as to calculate a rotation angle, wherein the first angle is calculated between a line, which passes centers of first and second shooting patterns included in the recognition pattern shot, and an edge of the recognition pattern shot; rotating the recognition pattern shot as much as the rotation angle so as to generate the rotated recognition pattern shot; and rotating the single-color shot as much as the rotation angle so as to generate the rotated single-color shot.

In the above method, the extracting includes obtaining the effective recognition pattern shot corresponding to the first divided region from the rotated recognition pattern shot based on the location of first and second rotated shooting patterns included in the rotated recognition pattern shot.

In the above method, the modifying further includes: calculating a relative distance corresponding to the distance between the first divided region and the camera based on the sizes of first and second effective shooting patterns included in the effective recognition pattern shot; expanding the effective single-color shot when the relative distance is greater than a reference distance so as to generate the modified single-color shot; outputting the effective single-color shot as the modified single-color shot when the relative distance is substantially the same as the reference distance; and reducing the effective single-color shot so as to generate the modified single-color shot when the relative distance is less than the reference distance.

In the above method, the compensating includes decreasing current to a plurality of target pixels of the display panel, wherein the target pixels correspond to a region having luminance in the whole single-color shot greater than a predetermined amount.

In the above method, the compensating further includes increasing current to a plurality of target pixels of the display panel, wherein the target pixels corresponds to a region having luminance in the whole single-color shot less than a predetermined amount.

Another aspect is a method of measuring light emission characteristics of a display panel, comprising: setting a location of a camera such that a imaging range area of the camera includes a first divided region among a plurality of divided regions, wherein the display panel is larger than the imaging range area of the camera and includes the divided regions, and wherein each of the divided regions is smaller than the imaging range area; first displaying a recognition pattern image on the first divided region; first receiving the first divided region shot by the camera so as to generate a recognition pattern shot; second displaying a single-color image on the first divided region; second receiving the first divided region shot by the camera so as to generate a single-color shot; modifying the single-color shot based on the recognition pattern shot so as to generate a modified single-color shot corresponding to the first divided region; repeatedly performing the setting, the first displaying, the first receiving, the second displaying, the second receiving, and the modifying until all of the modified single-color shots corresponding to the divided regions are generated; and combining all of the modified single-color shots so as to generate a whole single-color shot of the display panel.

According to at least one of the disclosed embodiments, a method of measuring light emitting status of a display panel measures a light emitting status of the display panel by taking pictures of the display panel partially and combining the partial pictures to a whole picture (=a whole shot) of the display panel even when it's hard to take a picture of the display panel at a time because the display panel is huge. A method of compensating light emitting status of a display panel can compensate light emitting status of the display panel by changing current to pixels corresponding to a region having a relatively high or low luminance in the display panel based on the whole shot.

DETAILED DESCRIPTION OF CERTAIN INVENTIVE EMBODIMENTS

Figure 1:
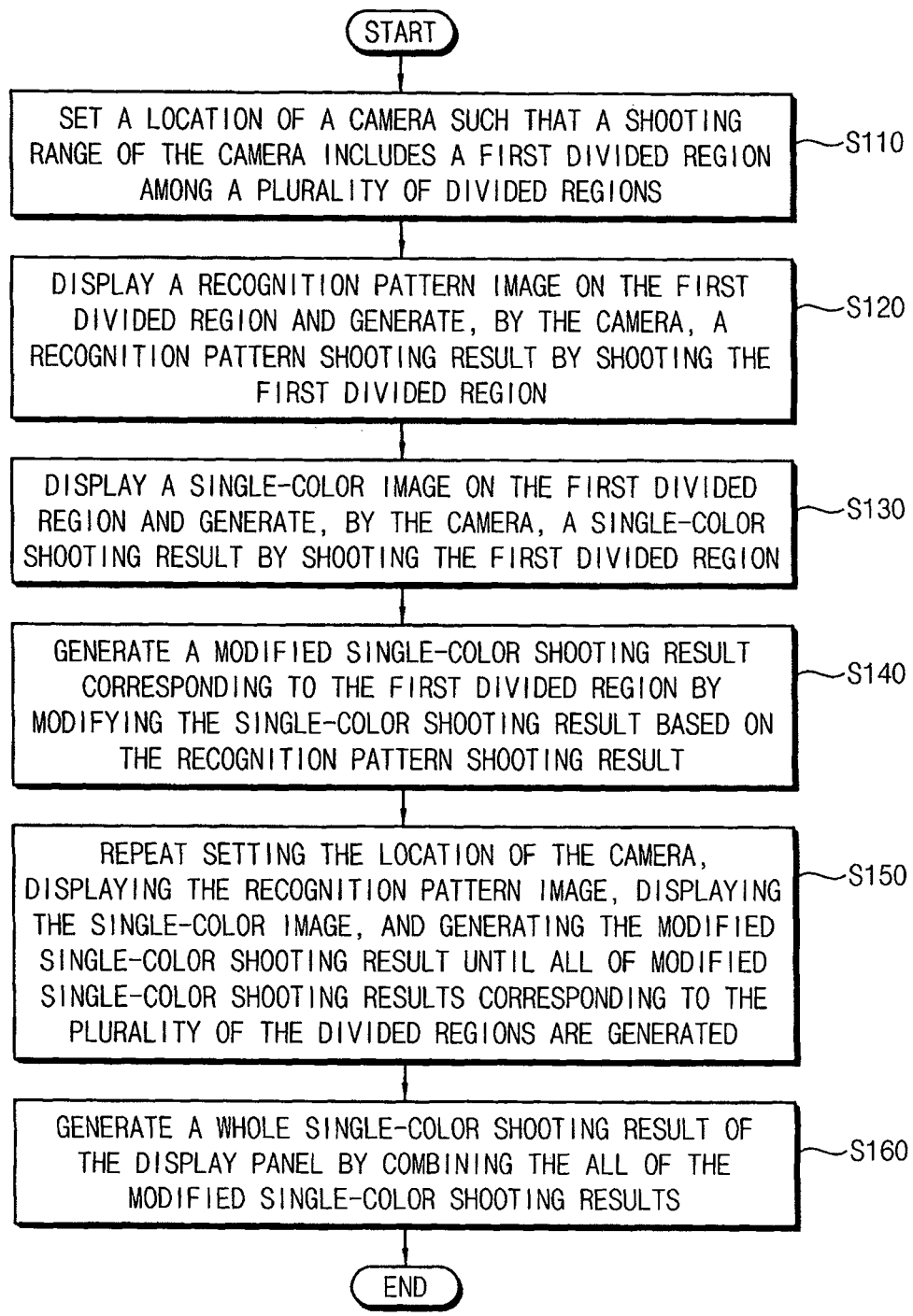
FIG. 1 is a flowchart illustrating a method of measuring light emitting status of a display panel according to an example embodiment.

When the pixel circuit of an OLED display corresponds to a logo (e.g., NBC, CBS) and displays the same pattern consistently with high luminance in a display panel, mobility of the driving transistor degrades because of a consistently strong current. After degradation, images stick on the pixel circuits such that viewers can still see the logo after other images are displayed.

In order to mitigate this image-sticking, a camera takes pictures of the display panel to measure the amount of image-stick, but it is difficult to take a picture of the entire display panel in a single frame.

Various example embodiments will be described more fully hereinafter with reference to the accompanying drawings, in which some example embodiments are shown. The described technology can, however, be embodied in many different forms and should not be construed as limited to the example embodiments set forth herein. Rather, these example embodiments are provided so that this disclosure will be thorough and complete, and will fully convey the scope of the described technology to those skilled in the art. In the drawings, the sizes and relative sizes of layers and regions can be exaggerated for clarity. Like numerals refer to like elements throughout.

It will be understood that, although the terms first, second, third etc. can be used herein to describe various elements, these elements should not be limited by these terms. These terms are used to distinguish one element from another. Thus, a first element discussed below could be termed a second element without departing from the teachings of the described technology. As used herein, the term "and/or" includes any and all combinations of one or more of the associated listed items.

It will be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the described technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIG. 1 is a flowchart illustrating a method of measuring light emitting status of a display panel according to an example embodiment.

In some embodiments, the FIG. 1 procedure is implemented in a conventional programming language, such as C or C++ or another suitable programming language. The program can be stored on a computer accessible storage medium of the emitting status measuring system 200 (see FIG. 3), for example, a memory (not shown) of the emitting status measuring system 200 or computer 230 (see FIG. 3). In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 1. The description of this paragraph applies to the embodiments shown in FIGS. 2, 6, 11, 14-15 and 23-25.

Referring to FIG. 1, a display panel is larger than a shooting range (or imaging range) of a camera and has a plurality of divided regions, each of which is smaller than the shooting range. A method of measuring light emitting status of the display panel includes: setting a location of the camera such that the shooting range includes a first divided region among the divided regions (S110); displaying a recognition pattern image on the first divided region and generating, by the camera, a recognition pattern shot by image capture of the first divided region (S120); displaying a single-color image on the first divided region and generating, by the camera, a single-color shot by image capture of the first divided region (S130); generating a modified single-color shot corresponding to the first divided region by modifying the single-color shot based on the recognition pattern shot (S140); repeating setting the location of the camera, displaying the recognition pattern image, displaying the single-color image, and generating the modified single-color shot until all of the modified single-color shots corresponding to the divided regions are generated (S150); and generating a whole single-color shot of the display panel by combining the all of the modified single-color shots (S160).

Figure 2:
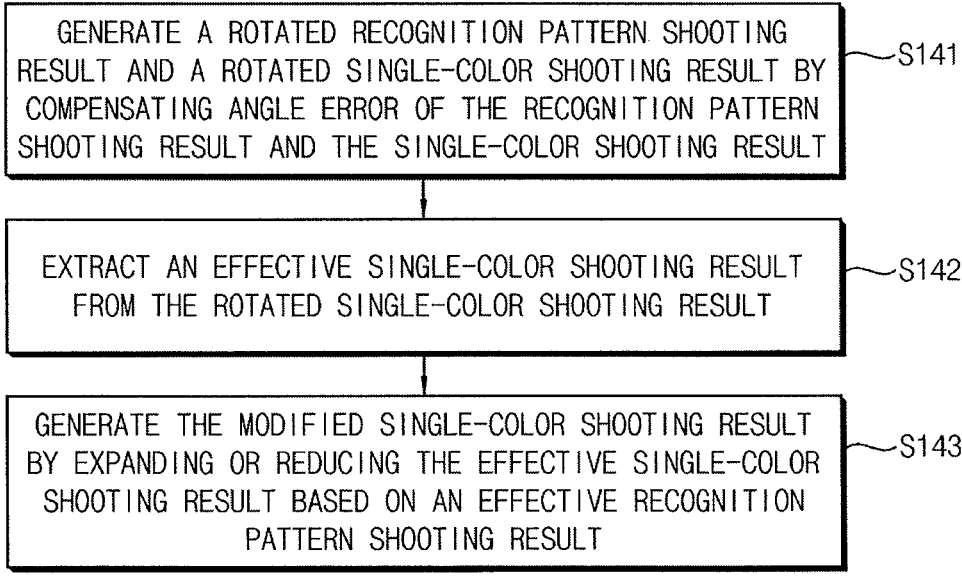
FIG. 2 is a flowchart illustrating generation of the modified single-color shot included in the flowchart of FIG. 1.

FIG. 2 is a flowchart illustrating generation of the modified single-color shot included in the flowchart of FIG. 1.

Referring to FIG. 2, generating the modified single-color shot (S140) includes: generating a rotated recognition pattern shot and a rotated single-color shot by compensating an angle error of the recognition pattern shot and the single-color shot (S141); extracting an effective single-color shot from the rotated single-color shot, the effective single-color shot corresponding to an effective recognition pattern shot included in the rotated recognition pattern shot (S142); and generating the modified single-color shot by expanding or reducing the effective single-color shot based on the effective recognition pattern shot (S143).

Generating the rotated recognition pattern shot and the rotated single-color shot (S141) will be described with reference to FIGS. 6 through 10. Extracting the effective single-color shot (S142) will be described with reference to FIGS. 11 through 13. Generating the modified single-color shot (S143) will be described with reference to FIGS. 14 through 19.

Figure 3:
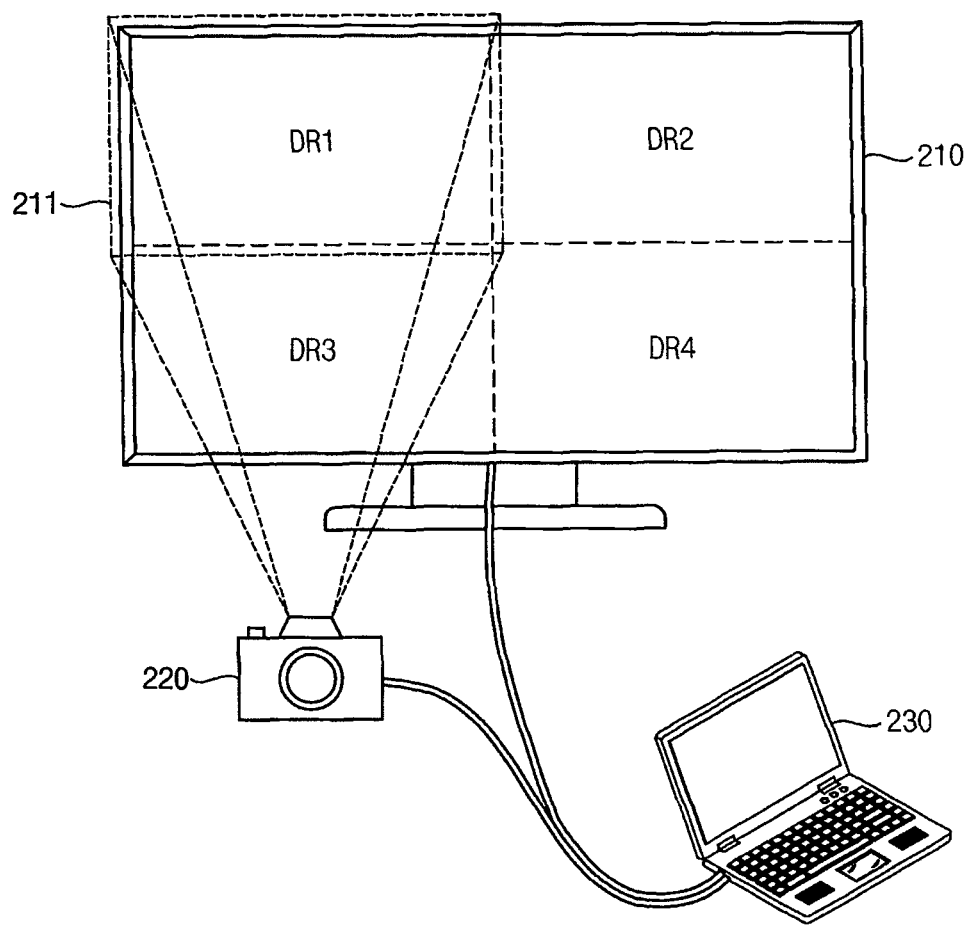
FIG. 3 is a diagram illustrating a light emitting status measuring system of the display panel according to an example embodiment.

FIG. 3 is a diagram illustrating a light emitting status measuring system of the display panel according to an example embodiment.

Referring to FIG. 3, a light emitting status measuring system 200 includes a display panel 210, a computer 230, and a camera 220. The display panel 210 can be divided into a first divided region DR1, a second divided region DR2, a third divided region DR3, and a fourth divided region DR4. In some embodiments, the display panel 210 is divided into more or fewer divided regions than the first through fourth divided regions DR1, DR2, DR3, and DR4. In some embodiments, each of the divided regions DR1, DR2, DR3, and DR4 is substantially rectangular.

The computer 230 can provide a recognition pattern image or a single-color image to the display panel 210. The computer 230 can store and process shot of the camera 220.

Setting the location of the camera (S110) in the flowchart of FIG. 1 can include setting the location of the camera 220 such that the shooting range 211 of the camera 220 includes the first divided region DR1.

Figure 4:
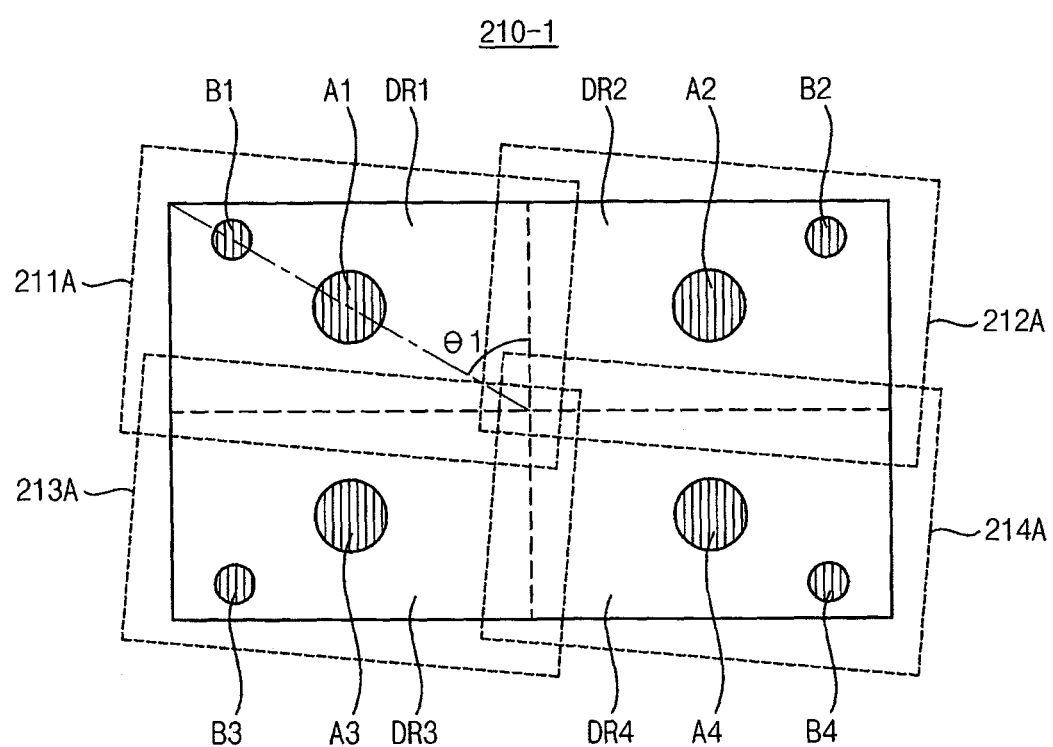
FIG. 4 is a diagram illustrating a display of the recognition pattern image on the first divided region included in the flowchart of FIG. 1.

FIG. 4 is a diagram illustrating a display of the recognition pattern image on the first divided region included in the flowchart of FIG. 1.

Referring to FIG. 4, the display panel 210-1 displays the first recognition pattern image on the first divided region DR1, displays the second recognition pattern image on the second divided region DR2, displays the third recognition pattern image on the third divided region DR3, and displays the fourth recognition pattern image on the fourth divided region DR4. The first recognition pattern image includes a first pattern A1 disposed at a center of the first recognition pattern image, and a second pattern B1 having a center located on a line or straight line, which passes a center of the first pattern A1 and a vertex of the first recognition pattern image. The second recognition pattern image includes a third pattern A2 disposed at a center of the second recognition pattern image, and a fourth pattern B2 having a center located on a line or straight line, which passes a center of the third pattern A2 and a vertex of the second recognition pattern image. The third recognition pattern image includes a fifth pattern A3 disposed at a center of the third recognition pattern image, and a sixth pattern B3 having a center located on a line or straight line, which passes a center of the fifth pattern A3 and a vertex of the third recognition pattern image. The fourth recognition pattern image includes a seventh pattern A4 disposed at a center of the fourth recognition pattern image, and an eighth pattern B4 having a center located on a line or straight line, which passes a center of the seventh pattern A4 and a vertex of the fourth recognition pattern image.

In some embodiments, each of the patterns A1, B1, A2, B2, A3, B3, A4, and B4 has a circle shape. In some embodiments, the size of the first, third, fifth, and seventh patterns A1, A2, A3, and A4 are respectively different from the size of the second, fourth, sixth, and eighth patterns B1, B2, B3, and B4.

A reference angle $\theta1$ is formed between the line, which passes the centers of first and second patterns A1, B1 included in the first recognition pattern image, and an edge of the first recognition pattern image.

The camera 220 can shoot the first divided region DR1 displaying the first recognition pattern image, generate the first recognition pattern shot 211A, and transfer the first recognition pattern shot 211A to the computer 230. The camera 220 can shoot the second divided region DR2 displaying the second recognition pattern image, generate the second recognition pattern shot 212A, and transfer the second recognition pattern shot 212A to the computer 230. The camera 220 can shoot the third divided region DR3 displaying the third recognition pattern image, generate the third recognition pattern shot 213A, and transfer the third recognition pattern shot 213A to the computer 230. The camera 220 can shoot the fourth divided region DR4 displaying the fourth recognition pattern image, generate the fourth recognition pattern shot 214A, and transfer the fourth recognition pattern shot 214A to the computer 230. Hereinafter, the first recognition pattern shot 211A will be described, and the second through fourth recognition pattern shot 212A, 213A, and 214A can be understood based on the description of the case about the first recognition pattern shot 211A.

Figure 5:
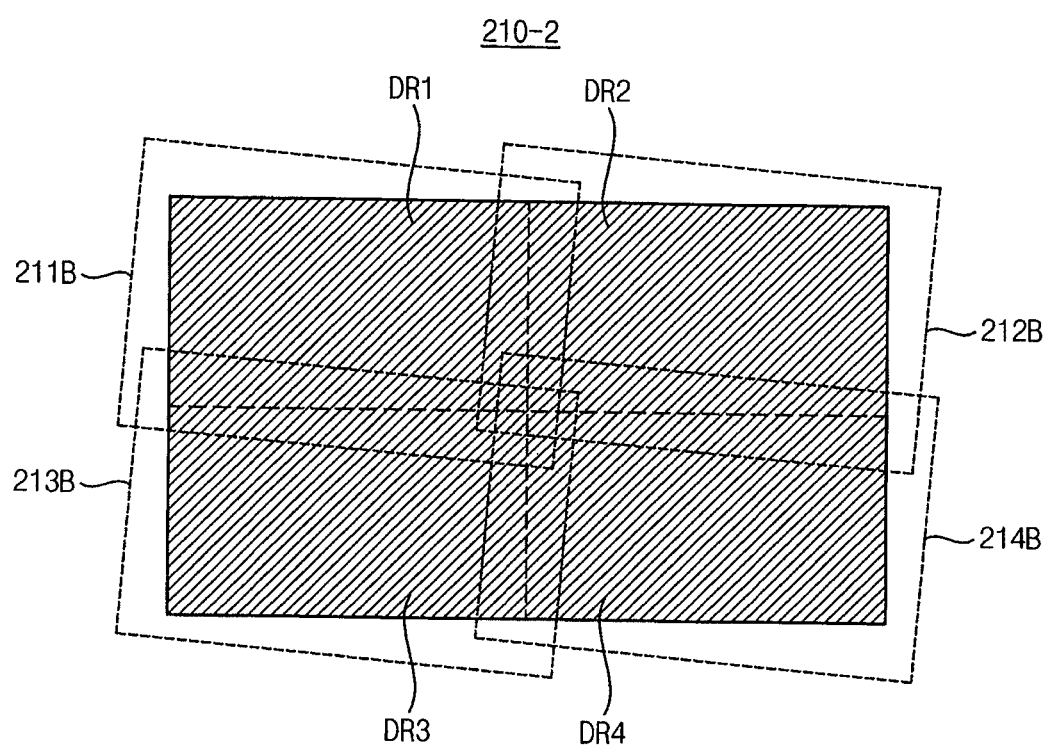
FIG. 5 is a flowchart illustrating a display of the single-color image on the first divided region included in the flowchart of FIG. 1.

FIG. 5 is a flowchart illustrating a display of the single-color image on the first divided region included in the flowchart of FIG. 1.

Referring to FIG. 5, the display panel 210-2 displays a single-color image on the first to fourth divided regions DR1-DR4. The camera 220 can shoot the first divided region DR1 displaying the single-color image, generate the first single-color shot 211B, and transfer the first single-color shot 211B to the computer 230. The camera 220 can shoot the second divided region DR2 displaying the single-color image, generate the second single-color shot 212B, and transfer the second single-color shot 212B to the computer 230. The camera 220 can shoot the third divided region DR3 displaying the single-color image, generate the third single-color shot 213B, and transfer the third single-color shot 213B to the computer 230. The camera 220 can shoot the fourth divided region DR4 displaying the single-color image, generate the fourth single-color shot 214B, and transfer the fourth single-color shot 214B to the computer 230.

Figure 6:
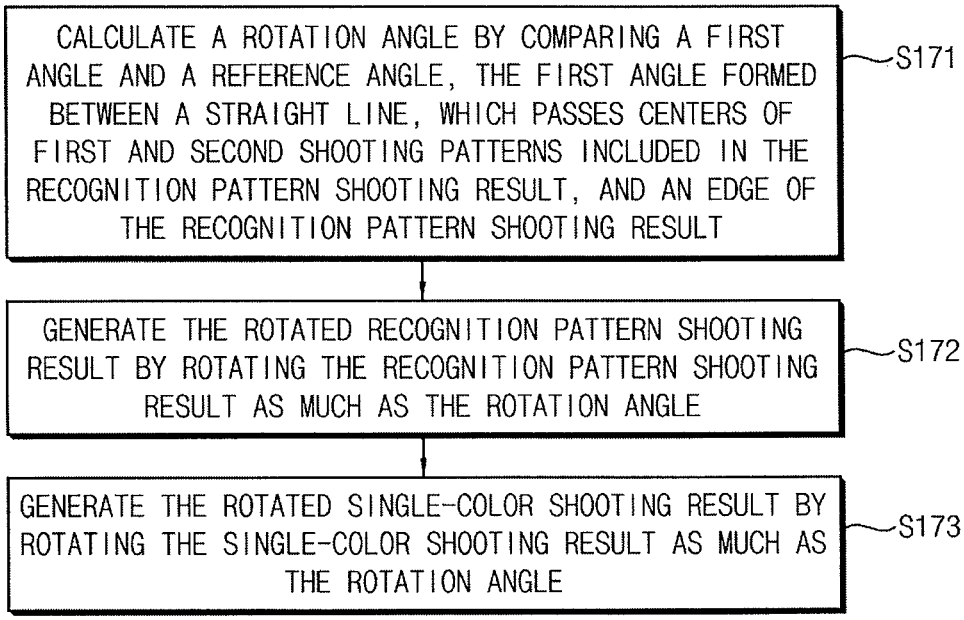
FIG. 6 is a flowchart illustrating generation of the rotated recognition pattern shot and the rotated single-color shot included in the flowchart of FIG. 2.

FIG. 6 is a flowchart illustrating generation of the rotated recognition pattern shot and the rotated single-color shot included in the flowchart of FIG. 2.

Referring to FIG. 6, generating the rotated recognition pattern shot and the rotated single-color shot (S141) includes: calculating a rotation angle by comparing a first angle and a reference angle, the first angle formed between a straight line, which passes centers of first and second shooting patterns included the recognition pattern shot, and an edge of the recognition pattern shot (S171); generating the rotated recognition pattern shot by rotating the recognition pattern shot as much as the rotation angle (S172); and generating the rotated single-color shot by rotating the single-color shot as much as the rotation angle (S173).

Figure 7:
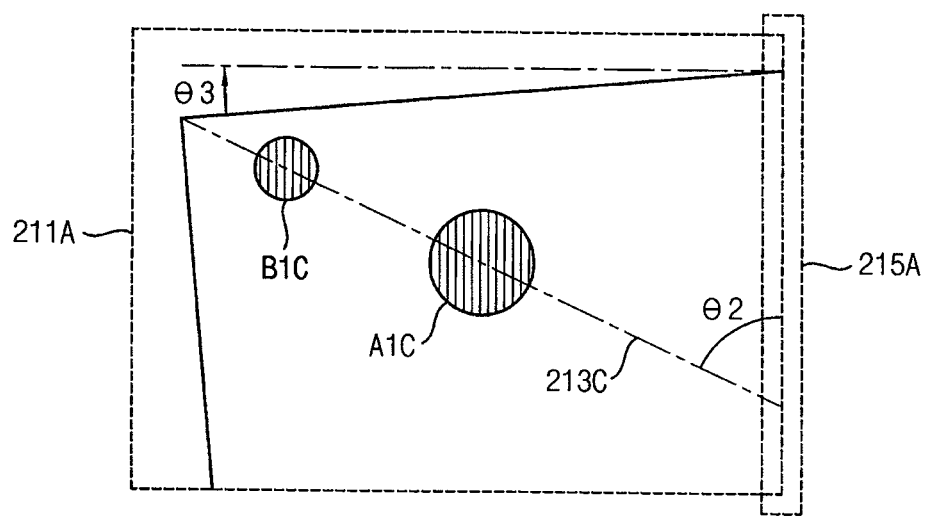
FIGS. 7 and 8 are diagrams illustrating a procedure of calculating a rotation angle from the first recognition pattern shot of FIG. 4, and generation of the first rotated recognition pattern shot by rotating the first recognition pattern shot as much as the rotation angle.
Figure 8:
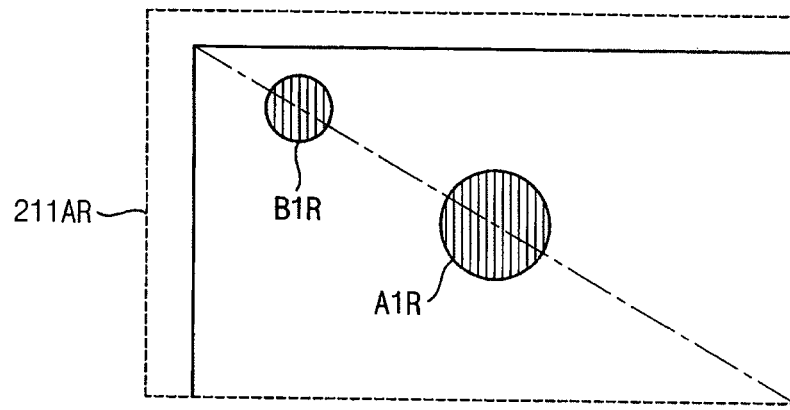

FIGS. 7 and 8 are diagrams illustrating a procedure of calculating a rotation angle from the first recognition pattern shot of FIG. 4, and generating the first rotated recognition pattern shot by rotating the first recognition pattern shot as much as the rotation angle.

Referring to FIGS. 7 and 8, the first recognition pattern shot 211A includes a first shooting pattern A1C corresponding to the first pattern A1, and a second shooting pattern B1C corresponding to the second pattern B1. The first rotated recognition pattern shot 211AR can include a first rotated shooting pattern MR corresponding to the first shooting pattern A1C, and a second rotated shooting pattern B1R corresponding to the second shooting pattern B1C.

Calculating the rotation angle (S171) can include calculating the rotation angle θ3 by comparing a first angle θ2 and the reference angle θ1. The first angle θ2 is formed between a straight line 213C which passes centers of the first and second shooting patterns A1C, B1C and an edge 215A of the first recognition pattern shot 211A. Generating the rotated recognition pattern shot (S172) can include generating the first rotated recognition pattern shot 211AR of FIG. 8 by rotating the first recognition pattern shot 211A as much as the rotation angle θ3.

Figure 9:
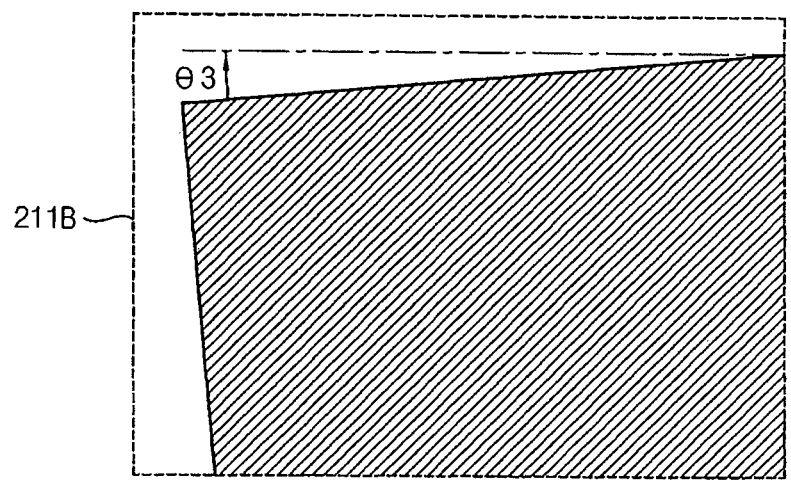
FIGS. 9 and 10 are diagrams illustrating a procedure of generating the first rotated single-color shot by rotating the first single-color shot of FIG. 5 as much as the rotation angle.
Figure 10:
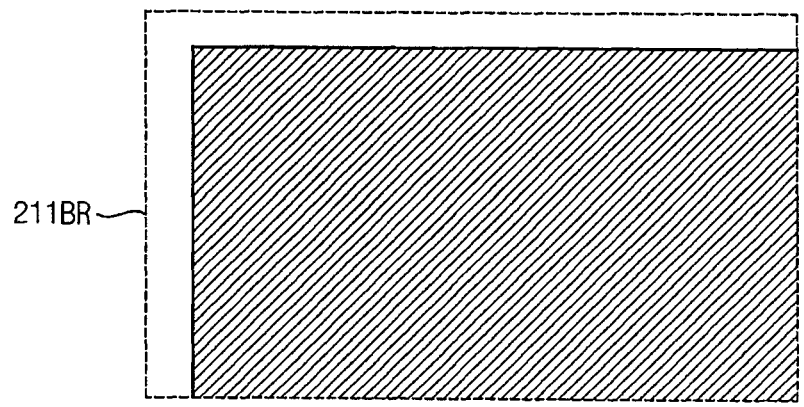

FIGS. 9 and 10 are diagrams illustrating a procedure of generating the first rotated single-color shot by rotating the first single-color shot of FIG. 5 as much as the rotation angle.

Referring to FIGS. 9 and 10, generating the rotated single-color shot (S173) includes generating the first rotated single-color shot 211BR of FIG. 10 by rotating the first single-color shot 211B of FIG. 9 as much as the rotation angle θ3.

Figure 11:
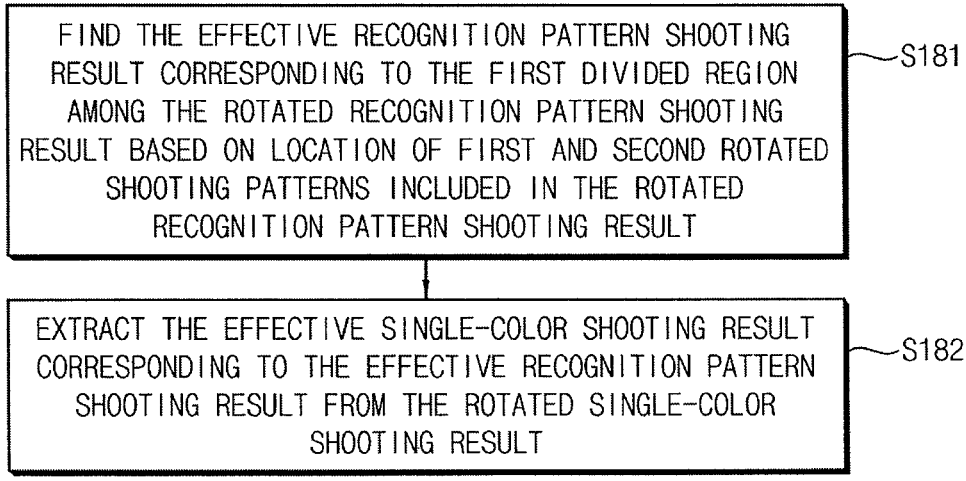
FIG. 11 is a flowchart illustrating generation of the effective single-color shot included in the flowchart of FIG. 2.

FIG. 11 is a flowchart illustrating generation of the effective single-color shot included in the flowchart of FIG. 2.

Referring to FIG. 11, extracting the effective single-color shot from the rotated single-color shot (S142) includes: finding the effective recognition pattern shot corresponding to the first divided region from the rotated recognition pattern shot based on the location of first and second rotated shooting patterns included in the rotated recognition pattern shot (S181); and extracting the effective single-color shot corresponding to the effective recognition pattern shot from the rotated single-color shot (S182).

Figure 12:
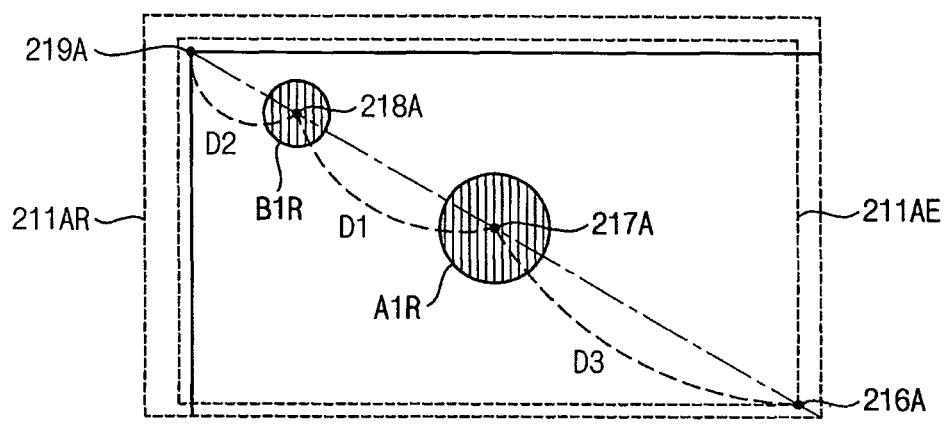
FIG. 12 is a diagram illustrating a procedure of extracting the first effective recognition pattern shot from the first rotated recognition pattern shot of FIG. 8.

FIG. 12 is a diagram illustrating a procedure of extracting the first effective recognition pattern shot from the first rotated recognition pattern shot of FIG. 8.

Referring to FIG. 12, finding the effective recognition pattern shot (S181) includes (1) calculating a first distance D1 between a center 217A of the first rotated shooting pattern A1R and a center 218A of the second rotated shooting pattern B1R, (2) calculating a second distance D2 by multiplying the first distance D1 and a pre-determined first ratio, (3) calculating a location of a first vertex 219A which is apart from the center 218A of the second rotated shooting pattern B1R as much as the second distance D2 in a direction from the center 217A of the first rotated shooting pattern A1R to the center 218A of the second rotated shooting pattern B1R, (4) calculating a third distance D3 by multiplying the first distance D1 and a pre-determined second ratio, (5) calculating a location of a second vertex 216A which is apart from the center 217A of the first rotated shooting pattern A1R as much as the third distance D3 in a direction from the center 218A of the second rotated shooting pattern B1R to the center 217A of the first rotated shooting pattern A1R, and (6) extracting a rectangle defined by the first vertex 219A and the second vertex 216A in the first rotated recognition pattern shot 211AR as the first effective recognition pattern shot 211AE.

Figure 13:
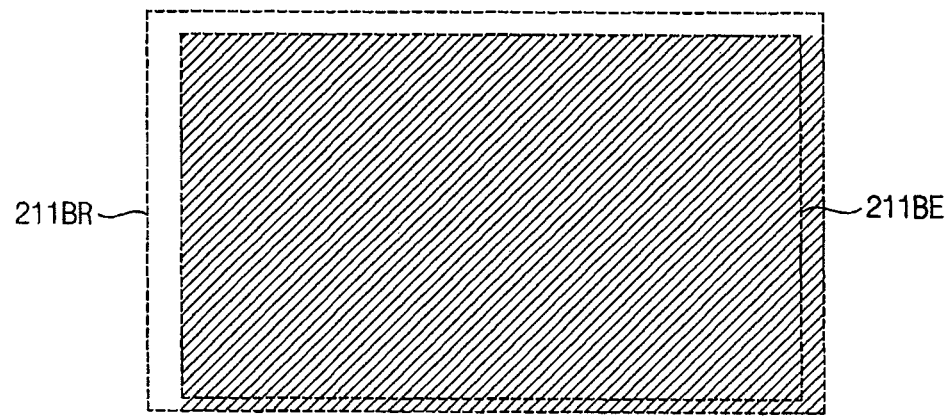
FIG. 13 is a diagram illustrating procedure of extracting the first effective single-color shot from the first rotated single-color shot of FIG. 10.

FIG. 13 is a diagram illustrating a procedure of extracting the first effective single-color shot from the first rotated single-color shot of FIG. 10.

Referring to FIG. 13, extracting the effective single-color shot (S182) includes extracting the first effective single-color shot 211BE corresponding to the first effective recognition pattern shot 211AE of FIG. 7 from the first rotated single-color shot 211BR.

Figure 14:
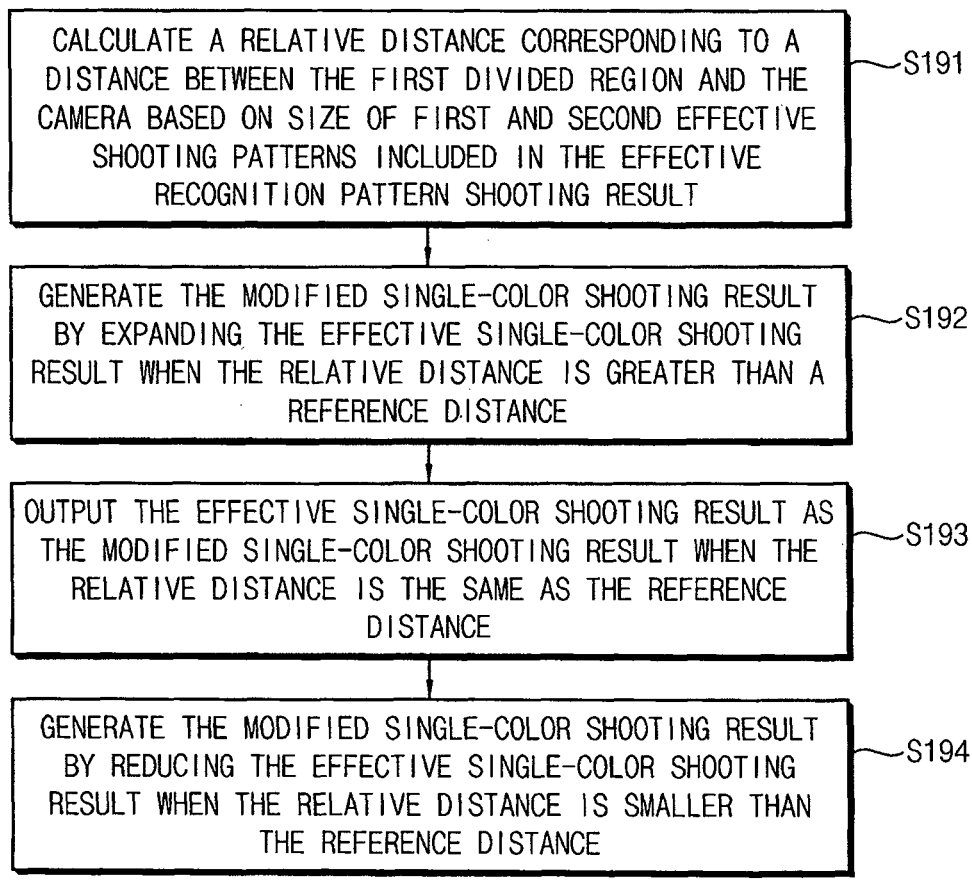
FIG. 14 is a flowchart illustrating generation of the modified single-color shot included in the flowchart of FIG. 2.

FIG. 14 is a flowchart illustrating generation of the modified single-color shot included in the flowchart of FIG. 2.

Referring to FIG. 14, generating the modified single-color shot (S143) includes calculating a relative distance corresponding to a distance between the first divided region and the camera based on size of first and second effective shooting patterns included in the effective recognition pattern shot (S191); generating the modified single-color shot by expanding the effective single-color shot when the relative distance is greater than a reference distance (S192); outputting the effective single-color shot as the modified single-color shot when the relative distance is substantially the same as the reference distance (S193); and generating the modified single-color shot by reducing the effective single-color shot when the relative distance is less than the reference distance (S194).

FIGS. 15 through 19 are diagrams illustrating steps included in the flowchart of FIG. 14.

Figure 15:
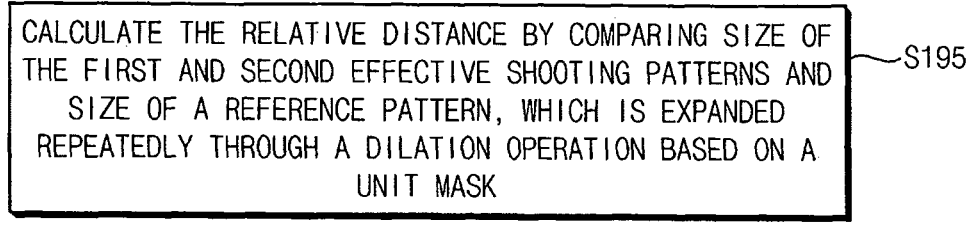
FIGS. 15 through 19 are diagrams illustrating steps included in the flowchart of FIG. 14.

Referring to FIG. 15, calculating the relative distance (S191) includes calculating the relative distance by comparing the sizes of the first and second effective shooting patterns and the size of a reference pattern, which is expanded repeatedly through a dilation operation based on a unit mask (S195). The step (S195) will be described with reference to FIGS. 16 through 19.

Figure 16:
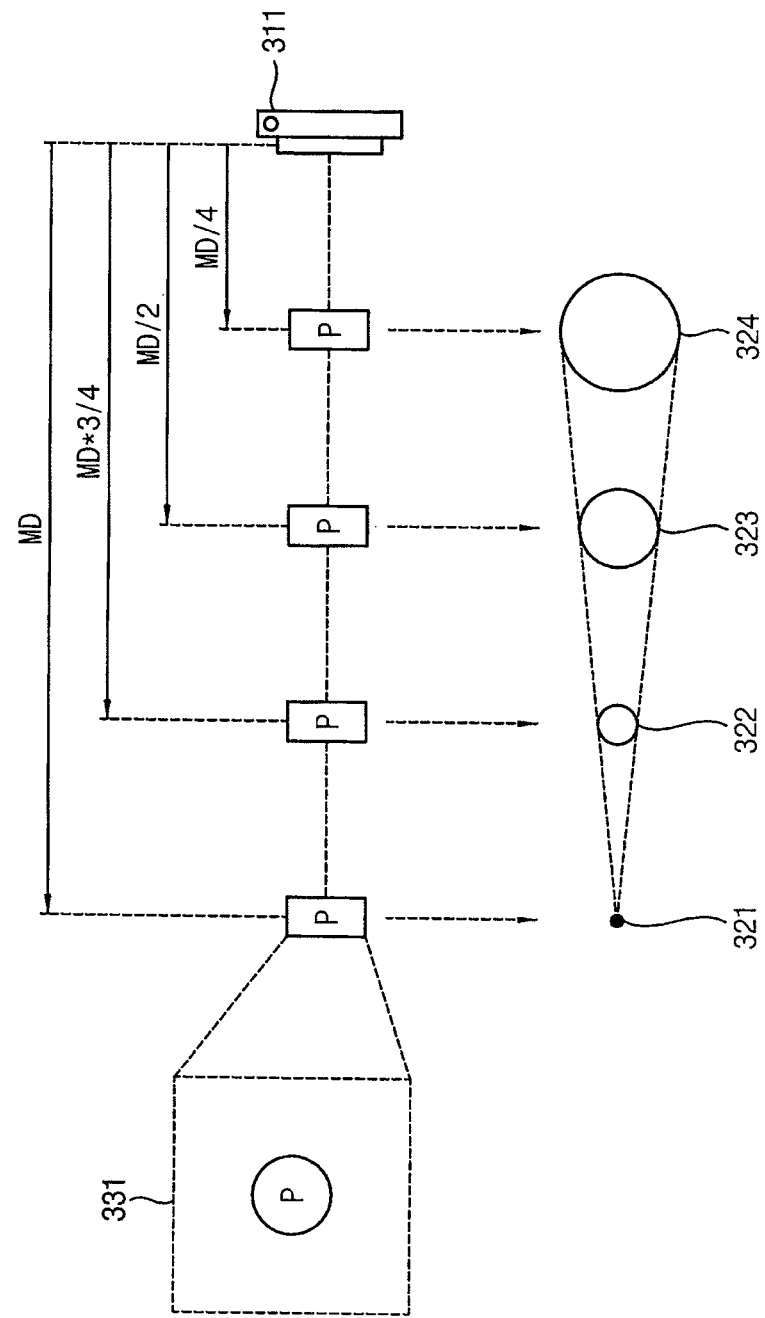

Referring to FIG. 16, a maximum distance MD indicates the distance between the camera 311 and a pattern P 331 when the size of the first shooting pattern 321, which is generated by the camera 311 by image capture of the pattern P, becomes 1 pixel. The sizes of the shooting patterns 321, 322, 323, and 324 are inversely proportional to a distance between the camera 311 and the pattern P.

In FIG. 16, the size of the pattern P becomes substantially equal to the size of the shooting pattern 323 when the distance between the camera 311 and the pattern P is MD/2.

Figures 17, 18:
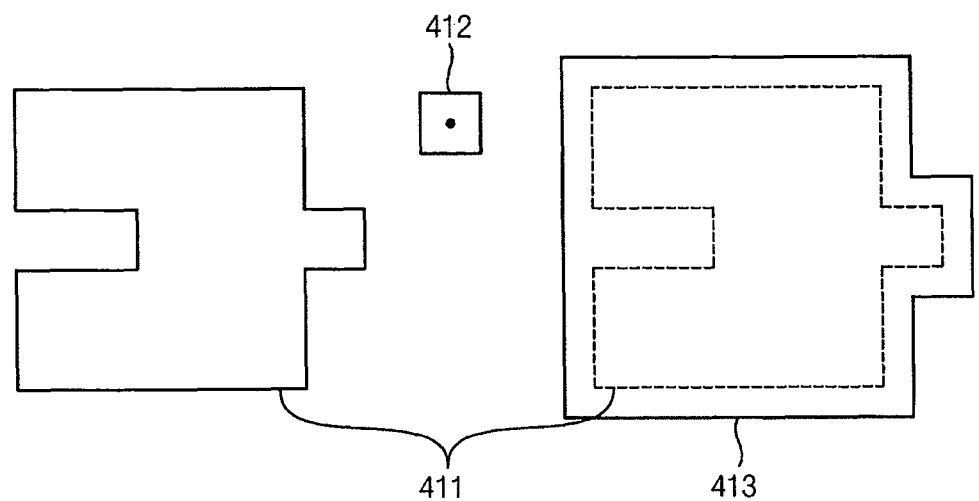

FIG. 17 illustrates a procedure of generating an expanded shooting pattern 413 by applying a dilation operation using a unit mask 412 to the shooting pattern 411. When a center of the unit mask 412 is placed over a pixel included in the shooting pattern, the shooting pattern 411 can be expanded by adding area of the unit mask 412 to the shooting pattern 411. The expanded shooting pattern 413 can be generated when the expansion procedure is applied to all pixels included in the shooting pattern 411.

The unit mask 412 can be a circle, a triangle, or a rhombus, other than the shown rectangle.

FIG. 18 shows a pseudo code illustrating an algorithm calculating a relative distance corresponding to the distance between the camera and the pattern of FIG. 16 by using iterative dilation operations. The algorithm can calculate a relative distance RD corresponding to a distance between the camera 311 and the pattern P based on the size of the shooting pattern A, which is generated by the camera 311 by image capture of the pattern P.

The reference pattern B is initialized as 1 pixel. The relative distance RD is initialized as MAXIMUM value (MAX). The initialized reference pattern B corresponds to the first shooting pattern 321 of FIG. 16, and the MAXIMUM value corresponds to the maximum distance MD of FIG. 16.

When the shooting pattern A is larger than the reference pattern B, the result of dilation operation on the reference pattern B and the unit mask m (B DIL m) is stored as the reference pattern B and the relative distance RD is decreased by 1. The relative distance RD corresponding to the distance between the camera 311 and the pattern P can be calculated by repeating the calculation before the reference pattern B becomes larger than the shooting pattern A.

A reference distance ID can be the relative distance RD corresponding to MD/2, which is a distance between the camera 311 and the pattern P when the size of the pattern P becomes substantially equal to the size of the shooting pattern A.

Figure 19:
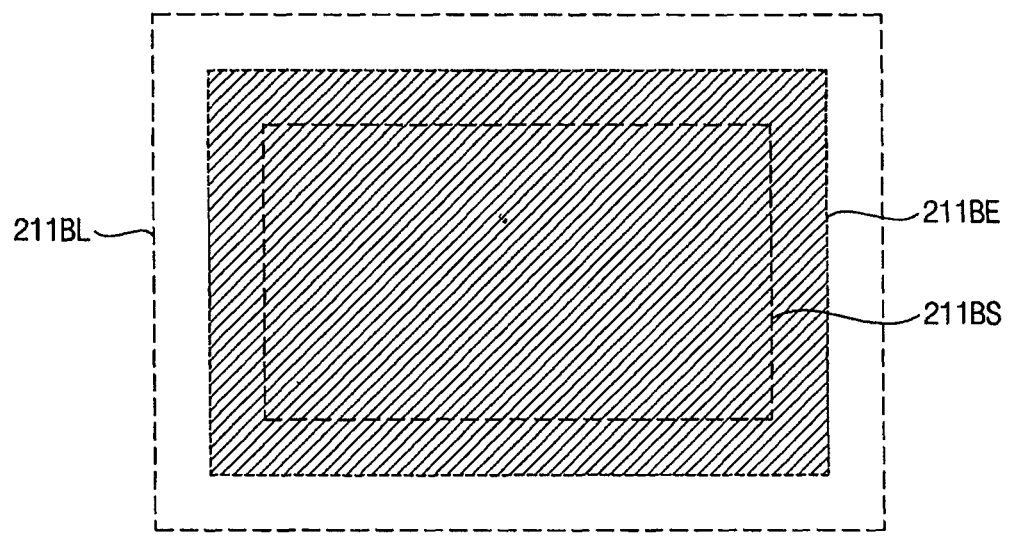

Referring to FIG. 19, generating the modified single-color shot by expanding the effective single-color shot (S192) includes generating the first modified single-color shot 211B_EDITED, which is an expanded result 211BL of the first effective single-color shot 211BE when the relative distance RD of FIG. 18 is greater than the reference distance ID. Outputting the effective single-color shot as the modified single-color shot when the relative distance is substantially the same as the reference distance (S193) can include outputting the first effective single-color shot 211BE as the first modified single-color shot 211B_EDITED when the relative distance RD of FIG. 18 is substantially the same as the reference distance ID. Generating the modified single-color shot by reducing the effective single-color shot when the relative distance is less than the reference distance (S194) can include generating the first modified single-color shot 211B_EDITED, which is a reduced result 211BS of the first effective single-color shot 211BE when the relative distance RD of FIG. 18 is less than the reference distance ID.

Figure 20:
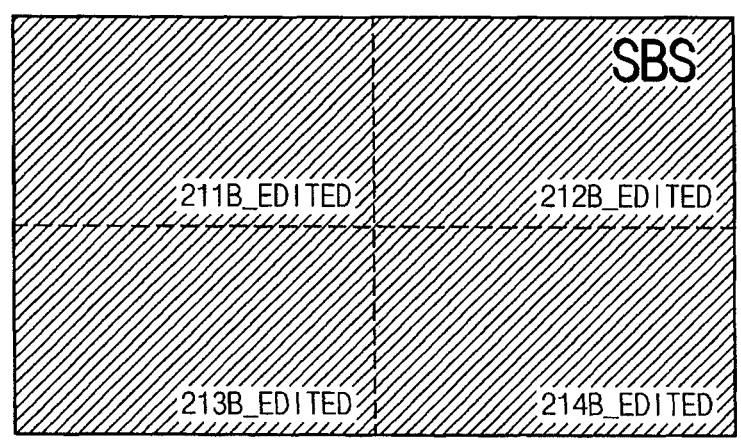
FIG. 20 illustrates generation of the whole single-color shot of the display panel included in the flowchart of FIG. 1.

FIG. 20 is illustrates generation of the whole single-color shot of the display panel included in the flowchart of FIG. 1.

Referring to FIG. 20, generating the whole single-color shot of the display panel (S160) includes generating the whole single-color shot of the display panel 210 by combining the first through fourth modified single-color shots 211B_EDITED, 212B_EDITED, 213B_EDITED, and 214B_EDITED generated by modifying the first through fourth single-color shots 211B, 212B, 213B, and 214B.

Procedure of generating the second through fourth modified single-color shots 212B_EDITED, 213B_EDITED, and 214B_EDITED can be understood based on the reference to FIGS. 6 through 19.

Figure 21:
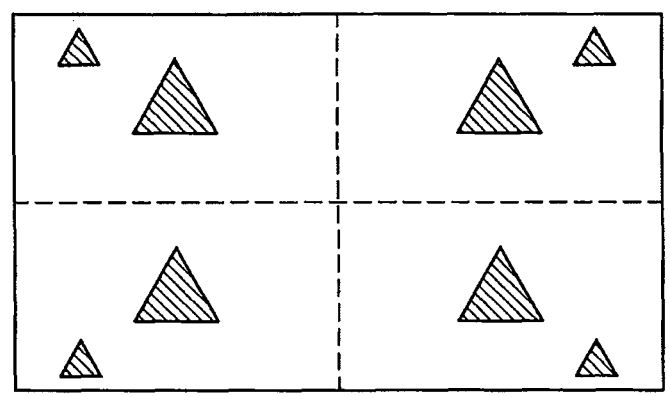
FIGS. 21 and 22 are diagrams illustrating example embodiments of recognition pattern image displayed on the display panel included in the light emitting status measuring system of FIG. 3.
Figure 22:
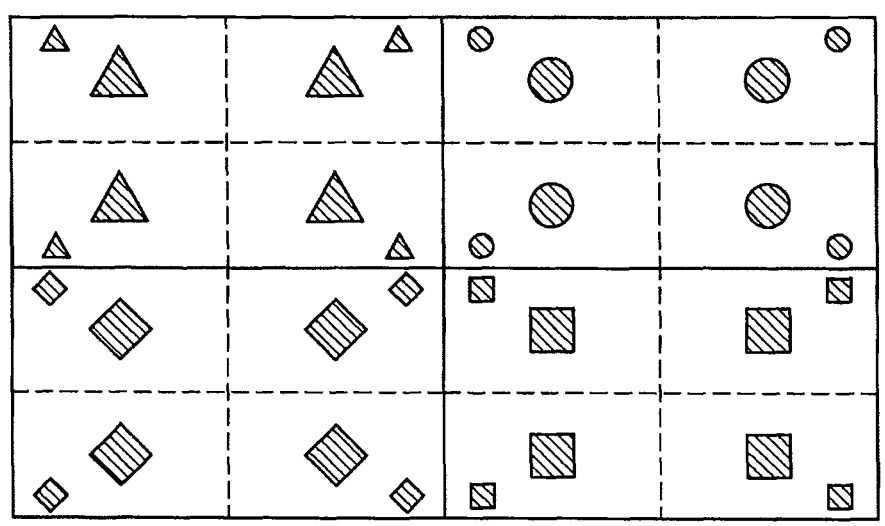

FIGS. 21 and 22 are diagrams illustrating example embodiments of a recognition pattern image displayed on the display panel included in the light emitting status measuring system of FIG. 3.

FIG. 21 shows an example embodiment where each of four divided regions of the display panel 210-3 includes triangles as the first and second patterns.

FIG. 22 shows another example embodiment where each of sixteen divided regions of the display panel 210-4 includes triangles, circles, rhombuses, or rectangles as the first and second patterns.

Figure 23:
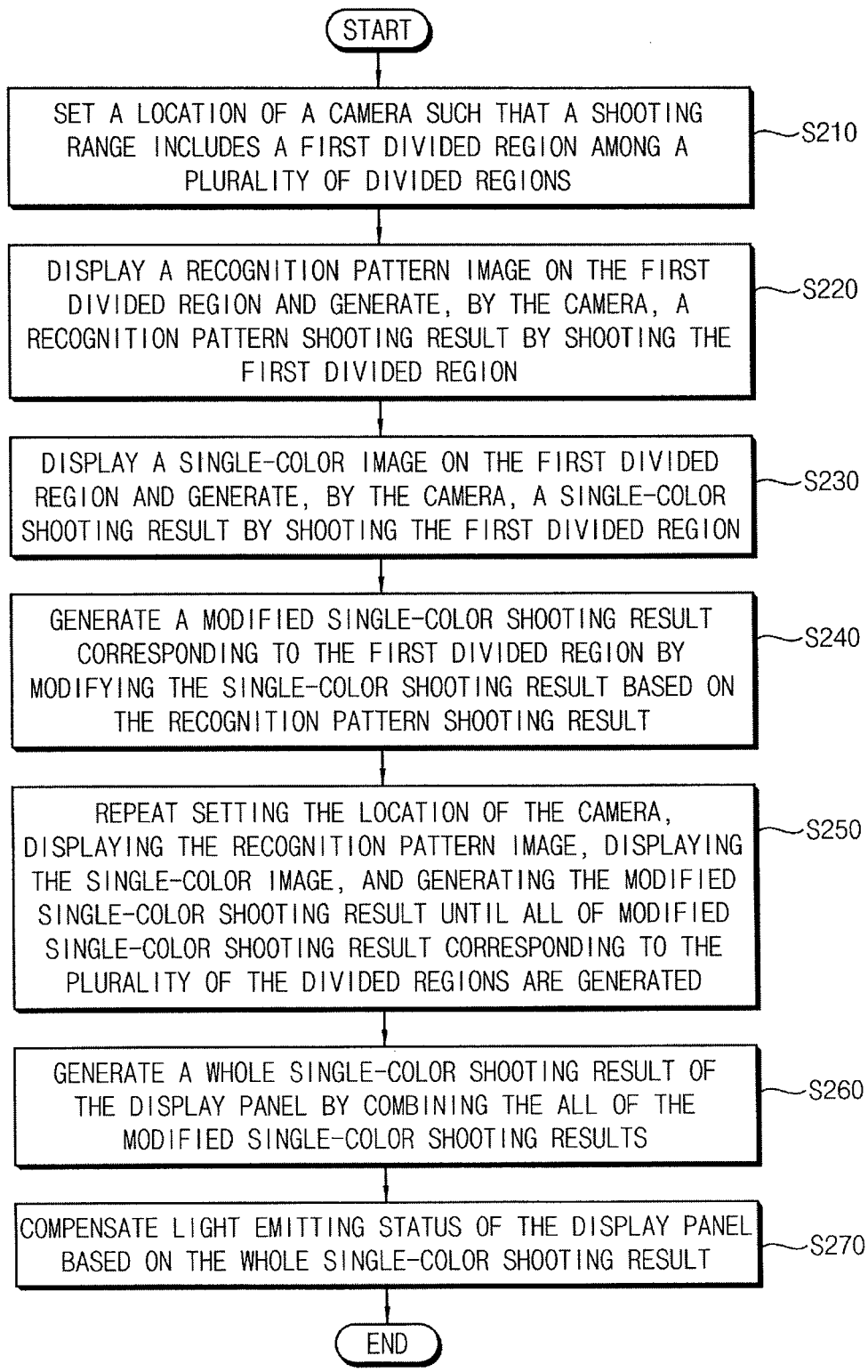
FIG. 23 is a flowchart illustrating a method of compensating light emitting status of the display panel according to example embodiments.

FIG. 23 is a flowchart illustrating a method of compensating light emitting status of the display panel according to example embodiments.

Referring to FIG. 23, a display panel is larger than a shooting range of a camera and has a plurality of divided regions, each of which is smaller than the shooting range. A method of compensating light emitting status of the display panel includes: setting a location of the camera such that the shooting range includes a first divided region among the divided regions (S210); displaying a recognition pattern image on the first divided region and generating, by the camera, a recognition pattern shot by image capture of the first divided region (S220); displaying a single-color image on the first divided region and generating, by the camera, a single-color shot by image capture of the first divided region (S230); generating a modified single-color shot corresponding to the first divided region by modifying the single-color shot based on the recognition pattern shot (S240); repeating setting the location of the camera, displaying the recognition pattern image, displaying the single-color image, and generating the modified single-color shot until all of modified single-color shot corresponding to the divided regions are generated (S250); generating a whole single-color shot of the display panel by combining the all of the modified single-color shots (S260); and compensating light emitting status of the display panel based on the whole single-color shot (S270).

The steps (S210 through S260) can be understood based on the reference to FIGS. 1 through 22. Compensating the light emitting status of the display panel (S270) will be described with the reference to FIG. 25.

Figure 24:
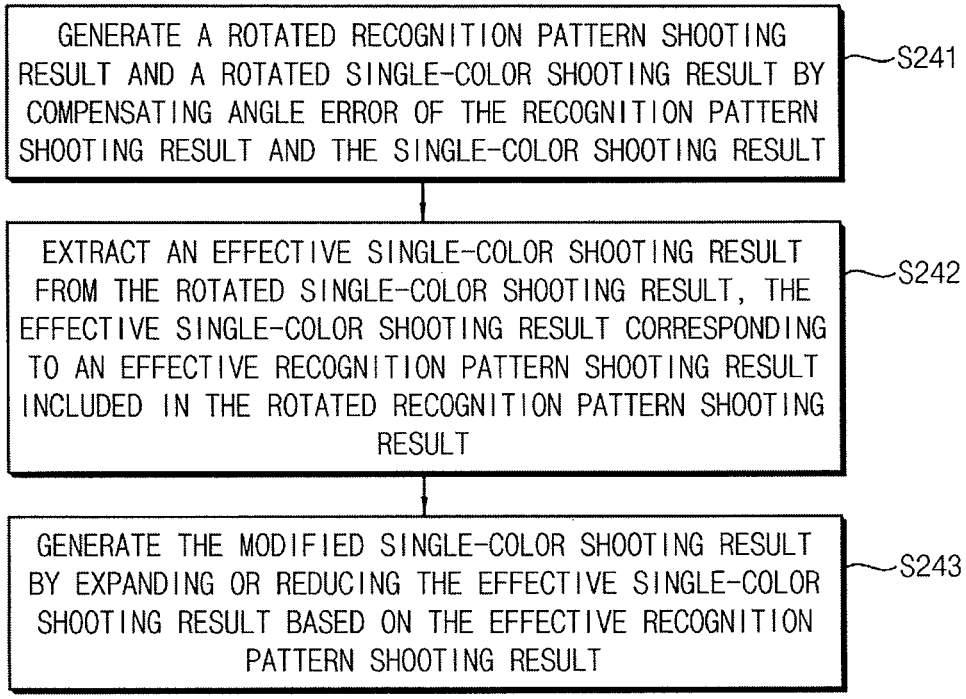
FIG. 24 is a flowchart illustrating generation of the modified single-color shot included in the flowchart of FIG. 23.

FIG. 24 is a flowchart illustrating generating the modified single-color shot included in the flowchart of FIG. 23.

Referring to FIG. 24, generating the modified single-color shot (S240) includes generating a rotated recognition pattern shot and a rotated single-color shot by compensating angle error of the recognition pattern shot and the single-color shot (S241); extracting an effective single-color shot from the rotated single-color shot, the effective single-color shot corresponding to an effective recognition pattern shot included in the rotated recognition pattern shot (S242); and generating the modified single-color shot by expanding or reducing the effective single-color shot based on the effective recognition pattern shot (S243).

The steps S241 through S243 can be understood based on the reference to FIGS. 2 through 19.

Figure 25:
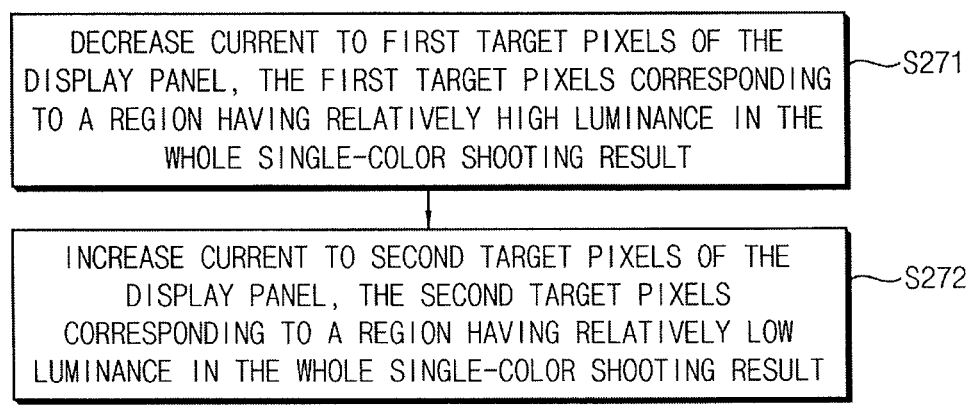
FIG. 25 is a flowchart illustrating compensation of the light emitting status of the display panel included in the flowchart of FIG. 23.

FIG. 25 is a flowchart illustrating compensation of the light emitting status of the display panel included in the flowchart of FIG. 23.

Referring to FIG. 25, compensating the light status of the display panel (S270) includes decreasing current to first target pixels of the display panel, the first target pixels corresponding to a region having relatively high luminance in the whole single-color shot (S271); and increasing current to second target pixels of the display panel, the second target pixels corresponding to a region having has relatively low luminance in the whole single-color shot (S272). In some embodiments, the target pixels correspond to a region where the luminance is greater than a predetermined amount. In other embodiments, the target pixels correspond to a region where the luminance is less than the predetermined amount.

Decreasing the current to the first target pixels of the display panel (S271) can include compensating the light emitting status of the display panel 210 by reducing the current to the first target pixels corresponding to a logo SBS included in the second modified single-color shot 212B_EDITED of FIG. 20 when the logo SBS is represented with relatively high luminance.

Increasing the current to the second target pixels of the display panel (S272) can include compensating the light emitting status of the display panel 210 by increasing the current to the second target pixels corresponding to the logo SBS included in the second modified single-color shot 212B_EDITED of FIG. 20 when the logo SBS is represented with relatively low luminance.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of measuring light emission characteristics of a display panel, comprising:
    setting a location of a camera such that a imaging range area of the camera includes a first divided region among a plurality of divided regions, wherein the display panel is larger than the imaging range area of the camera and includes the divided regions, and wherein each of the divided regions is smaller than the imaging range area;
    first displaying a recognition pattern image on the first divided region;
    first shooting the first divided region by the camera so as to generate a recognition pattern shot;
    second displaying a single-color image on the first divided region;
    second shooting the first divided region by the camera so as to generate a single-color shot;
    modifying the single-color shot based on the recognition pattern shot so as to generate a modified single-color shot corresponding to the first divided region;
    repeatedly performing the setting, the first displaying, the first shooting, the second displaying, the second shooting, and the modifying until all of the modified single-color shots corresponding to the divided regions are generated; and
    combining all of the modified single-color shots so as to generate a whole single-color shot of the display panel.

2. The method of claim 1, wherein the modifying includes:
    compensating an angle error of the recognition pattern shot and the single-color shot so as to generate a rotated recognition pattern shot and a rotated single-color shot;
    extracting an effective single-color shot from the rotated single-color shot, wherein the effective single-color shot corresponds to an effective recognition pattern shot included in the rotated recognition pattern shot; and
    expanding or reducing the effective single-color shot based on the effective recognition pattern shot so as to generate the modified single-color shot.

3. The method of claim 2, wherein the compensating includes:
    comparing a first angle and a reference angle so as to calculate a rotation angle, wherein the first angle is calculated between a line, which passes centers of first and second shooting patterns included in the recognition pattern shot, and an edge of the recognition pattern shot;
    rotating the recognition pattern shot as much as the rotation angle so as to generate the rotated recognition pattern shot; and
    rotating the single-color shot as much as the rotation angle so as to generate the rotated single-color shot.

4. The method of claim 3, wherein the reference angle is formed between a line, which passes centers of first and second patterns included in the recognition pattern image, and an edge of the recognition pattern image.

5. The method of claim 2, wherein the extracting includes:
    finding the effective recognition pattern shot corresponding to the first divided region from the rotated recognition pattern shot based on the location of first and second rotated shooting patterns included in the rotated recognition pattern shot; and
    extracting the effective single-color shot corresponding to the effective recognition pattern shot from the rotated single color shot.

6. The method of claim 2, wherein the modifying further includes:
    calculating a relative distance corresponding to the distance between the first divided region and the camera based on the sizes of first and second effective shooting patterns included in the effective recognition pattern shot;
    expanding the effective single-color shot when the relative distance is greater than a reference distance so as to generate the modified single-color shot;
    outputting the effective single-color shot as the modified single-color shot when the relative distance is substantially the same as the reference distance; and
    reducing the effective single-color shot so as to generate the modified single-color shot when the relative distance is less than the reference distance.

7. The method of claim 6, wherein the calculating includes comparing the sizes of the first and second effective shooting patterns and the size of a reference pattern so as to calculate the relative distance, wherein the reference pattern is expanded repeatedly through a dilation operation via a unit mask.

8. The method of claim 6, wherein the reference distance is a relative distance corresponding to the distance between the first divided region and the camera when the sizes of first and second patterns included in the recognition pattern image are substantially the same as the sizes of the first and second effective shooting patterns.

9. The method of claim 1, wherein each of the divided regions has a rectangular shape.

10. The method of claim 1, wherein the recognition pattern image includes:
 a first pattern displayed at a center of the recognition pattern image; and
 a second pattern having a center located in a line that passes a center of the first pattern and a vertex of the recognition pattern image,
 wherein the recognition pattern shot includes:
  a first shooting pattern corresponding to the first pattern; and
  a second shooting pattern corresponding to the second pattern.

11. The method of claim 10, wherein the size of the first pattern is different from the size of the second pattern.

12. The method of claim 10, wherein each of the first and second patterns has a substantially circular, triangular, rectangular or rhombus shape.

13. A method of compensating light emission of a display panel, comprising:
 setting a location of a camera such that a imaging range area of the camera includes a first divided region among a plurality of divided regions, wherein the display panel is larger than the imaging range area and includes a plurality of divided regions, and wherein each of the divided regions is smaller than the imaging range area;
 first displaying a recognition pattern image on the first divided region;
 first shooting the first divided region so as to generate, by the camera, a recognition pattern shot;
 second displaying a single-color image on the first divided region;
 second shooting the first divided region so as to generate, by the camera, a single-color shot;
 modifying the single-color shot based on the recognition pattern shot so as to generate a modified single-color shot corresponding to the first divided region;
 repeatedly performing the setting, the first displaying, the first shooting, the second displaying, the second shooting and the modifying until all of the modified single-color shot corresponding to the divided regions are generated;
 combining all of the modified single-color shots so as to generate a whole single-color shot of the display panel; and
 compensating the light emission characteristics of the display panel based on the whole single-color shot.

14. The method of claim 13, wherein the modifying includes:
 compensating an angle error of the recognition pattern shot and the single-color shot so as to generate a rotated recognition pattern shot and a rotated single-color shot;
 extracting an effective single-color shot from the rotated single-color shot, wherein the effective single-color shot corresponds to an effective recognition pattern shot included in the rotated recognition pattern shot; and
 expanding or reducing the effective single-color shot based on the effective recognition pattern shot so as to generate the modified single-color shot.

15. The method of claim 14, wherein compensating the angle error includes:
 comparing a first angle and a reference angle so as to calculate a rotation angle, wherein the first angle is calculated between a line, which passes centers of first and second shooting patterns included in the recognition pattern shot, and an edge of the recognition pattern shot;
 rotating the recognition pattern shot as much as the rotation angle so as to generate the rotated recognition pattern shot; and
 rotating the single-color shot as much as the rotation angle so as to generate the rotated single-color shot.

16. The method of claim 14, wherein the extracting includes obtaining the effective recognition pattern shot corresponding to the first divided region from the rotated recognition pattern shot based on the location of first and second rotated shooting patterns included in the rotated recognition pattern shot.

17. The method of claim 14, wherein the modifying further includes:
 calculating a relative distance corresponding to the distance between the first divided region and the camera based on the sizes of first and second effective shooting patterns included in the effective recognition pattern shot;
 expanding the effective single-color shot when the relative distance is greater than a reference distance so as to generate the modified single-color shot;
 outputting the effective single-color shot as the modified single-color shot when the relative distance is substantially the same as the reference distance; and
 reducing the effective single-color shot so as to generate the modified single-color shot when the relative distance is less than the reference distance.

18. The method of claim 13, wherein the compensating includes decreasing current to a plurality of target pixels of the display panel, wherein the target pixels correspond to a region having luminance in the whole single-color shot greater than a predetermined amount.

19. The method of claim 13, wherein the compensating further includes increasing current to a plurality of target pixels of the display panel, wherein the target pixels corresponds to a region having luminance in the whole single-color shot less than a predetermined amount.

20. A method of measuring light emission characteristics of a display panel, comprising:
 setting a location of a camera such that a imaging range area of the camera includes a first divided region among a plurality of divided regions, wherein the display panel is larger than the imaging range area of the camera and includes the divided regions, and wherein each of the divided regions is smaller than the imaging range area;
 first displaying a recognition pattern image on the first divided region;
 first receiving the first divided region shot by the camera so as to generate a recognition pattern shot;
 second displaying a single-color image on the first divided region;

second receiving the first divided region shot by the camera so as to generate a single-color shot;
modifying the single-color shot based on the recognition pattern shot so as to generate a modified single-color shot corresponding to the first divided region;
repeatedly performing the setting, the first displaying, the first receiving, the second displaying, the second receiving, and the modifying until all of the modified single-color shots corresponding to the divided regions are generated; and
combining all of the modified single-color shots so as to generate a whole single-color shot of the display panel.

* * * * *